F. M. McKERNAN.
CONSTRUCTION OF GLASS MOLDS.
APPLICATION FILED MAY 21, 1908.
941,584.
Patented Nov. 30, 1909.
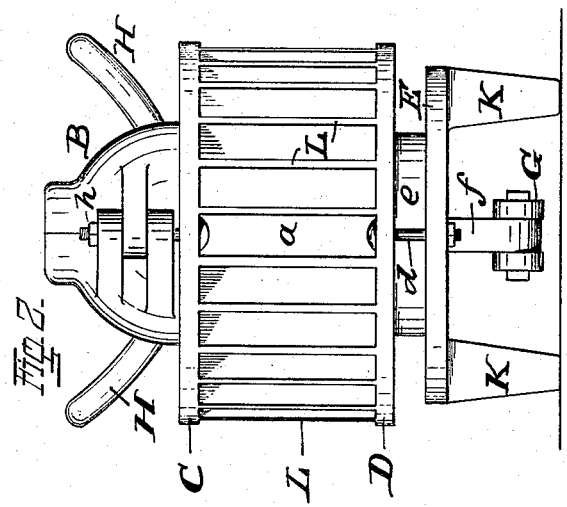
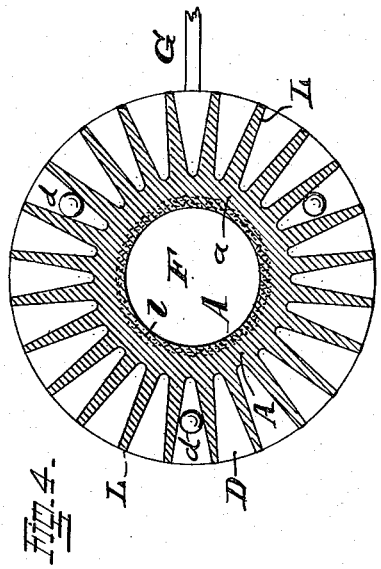
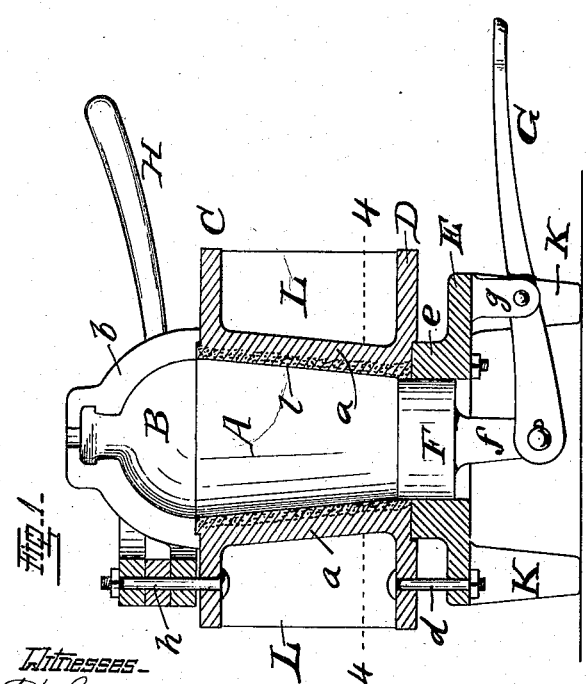
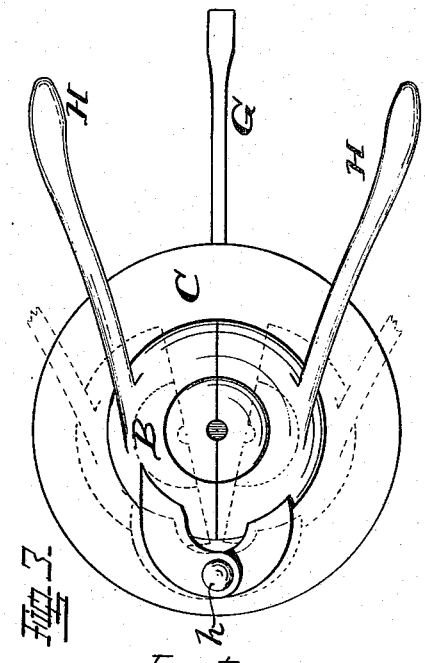
Witnesses
T. LeBeau
O. M. Schantz
Inventor
Frank M. McKernan
by C. Spengel Atty

UNITED STATES PATENT OFFICE.

FRANK M. McKERNAN, OF CINCINNATI, OHIO, ASSIGNOR OF ONE-HALF TO JAMES E. STACEY, OF CINCINNATI, OHIO.

CONSTRUCTION OF GLASS-MOLDS.

941,584.　　　　　　　　Specification of Letters Patent.　　Patented Nov. 30, 1909.

Application filed May 21, 1908. Serial No. 434,043.

*To all whom it may concern:*

Be it known that I, FRANK M. McKERNAN, a citizen of the United States, and a resident of Cincinnati, Hamilton county, State of Ohio, have invented certain new and useful Improvements in the Construction of Glass-Molds; and I do declare the following to be a clear, full, and exact description of the invention, attention being called to the accompanying drawing, with the reference characters marked thereon, which form also a part of this specification.

This invention relates to certain improvements in the construction and manufacture of a certain type of hand-manipulated glass-molds which are used for blowing bottles.

The object of my improvements is to render such molds more durable and less susceptible to destructive influences, particularly such due to the action of heat and to cause them also to turn out better and more perfect work.

In the following specification and particularly pointed out in the claims at the end thereof, will be found a full description of my invention, together with its operation, parts and construction, which latter is also illustrated in the accompanying drawing, in which:—

Figure 1, is a vertical section through such a glass mold, improved as contemplated by my invention. Fig. 2, is a side-elevation of the same taken on a plane at right angles to which the preceding section is taken. Fig. 3, is a top-view of the mold as shown in Fig. 1. Fig. 4, is a horizontal section of the same taken on line 4—4 of Fig. 1.

A is that part of the mold in which the lower and larger portion of the bottle is formed and B is that part in which the upper portion of the bottle is formed, both parts being complementary to each other and correspond to the shape which the bottle to be blown is intended to assume. This shape, as here presumed, is substantially cylindrical and the mold is formed accordingly. $a$ is the cylindrical wall of the lower part and $b$ is the wall of the upper part of the mold. Flanges C and D, extend horizontally from upper and lower edges respectively of wall $i$ of the lower mold part.

The entire mold rests upon a base E and more particularly upon an annular boss $e$ which is recessed into the lower part of the mold as shown.

Bolts $d$ hold the mold to this base. The bottom of the mold is constituted by a plunger F, which occupies an opening in base E and extends also partly into the lower part of the lower mold part A. A stem $f$ depends from the underside of this plunger and connects to a lever G, supported at $g$. After a bottle is blown and sufficiently rigid to permit its removal from the mold, action is had on plunger F, by means of this lever for the purpose of starting the bottle out of the mold. Before this is done, the upper mold part B which consists of two vertically divided sections, is opened laterally as indicated in dotted lines in Fig. 3, to permit the bottle to move up out of the lower mold part, when moved by plunger F. Handles H, on these sections of the upper mold-part serve for their manipulation accordingly, the sections being hingedly connected to each other and held to the upper flange C by a bolt $h$. Base E is provided with legs K.

These molds and particularly their lower part A, during use become intensely hot in a short time, the effect of which heating renders the inner surface of wall $a$ uneven and also causes it to warp out of shape, or become otherwise distorted, so as to prevent its proper fit and register with the upper mold part. Bottles of imperfect shape result from this. In their further extension these effects cause the inner surface of wall $a$ to crack, so that the resulting bottles are still more imperfect and mostly entirely useless while frequently their removal from the mold cannot be accomplished at all by reason of portions of the glass having been forced in to these cracks. Finally these effects by reaching still further, cause these cracks to extend entirely through the mold wall, so that a mold becomes absolutely useless and must be replaced by a new one. Since in such establishments using hand-manipulated molds a large number of operatives work hand in hand on an established routine, the interruption caused by such a break-down is quite vexatious and seriously impairs the service, by rendering a line of men idle for the time being.

My improvement consists of making wall $a$ of comparatively limited thickness, but rendering it rigid by a number of ribs L, which project radially from its outside and extend vertically between flanges C and D. These ribs, being fully exposed to contact with air, and thus air cooled, do not become so hot as to be warped out of shape and remaining rigid, hold also wall *a* to its shape: Furthermore, by forming integral parts of this wall, they aid to draw heat away from this latter and by dissipating it, prevent thereby the lower mold part from becoming excessively hot.

In casting the mold, a chill is used to form the core for it, so that the inner surface of wall *a* and portions next below this surface become chilled as indicated at *l*. A hard smooth surface is the result, which resists cracking, insures smooth glass shapes and also favors the free removal of the bottles from their mold.

It will now be seen, that by means of my improvements, these molds are rendered immune against the destructive effects of heat, their life and usefulness is extended and better and more perfect work may be turned out.

The upper mold-part being small, as compared with the lower part and divided in sections, is less susceptible to these injurious effects of the heat and therefore as to it, the use of ribs L may be dispensed with, except when the shape of the bottle is such as to demand a mold in which the upper part is also comparatively larger.

Having described my invention, I claim as new:

1. In a glass-mold, the combination of a base having legs and provided with a circular opening which is surrounded by an upwardly projecting boss, a lower mold-body substantially cylindrical and recessed in its lower end to fit upon the boss of this base upon which it is seated, flanges extending laterally from lower and upper ends of this mold-body and radially disposed, heat-dissipating and strengthening ribs projecting from the outside of this mold-body and extending vertically between the flanges thereof, a complementary upper mold-body consisting of two vertically divided sections fitted to seat upon the upper end of the lower mold-body, and each provided with hinge-lugs and with a handle for manual manipulation in a lateral direction to open and close this upper mold-body, bolts seated in both flanges of the lower mold-body and between the vertical ribs thereof, there being one in the upper flange serving as a pivot whereby by means of their hinge-lugs the sections of the upper mold-body are hinged to each other and pivotally connected to the lower mold-body, and a number of them whereby this latter mold-body is connected to the base, a plunger slidably fitted to the opening in this latter and a pivotally supported lever connected to the underside of this plunger and extending outwardly for manual operation to move the plunger from the opening in the base into the lower part of the lower mold-body and back again.

2. For a glass-mold, a one piece cast-metal mold-body of substantially cylindrical shape which has its wall of limited thickness and chilled on its inner-side to provide and maintain a smooth glass-molding surface, the outside being provided with air-cooled heat-dissipating projections to carry the heat away from the chilled inner surface to prevent cracking of the same.

In testimony whereof, I hereunto affix my signature in the presence of two witnesses.

FRANK M. McKERNAN.

Witnesses:
T. LE BEAU,
C. SPENGEL.